United States Patent
Kabishcer et al.

(10) Patent No.: US 11,372,565 B2
(45) Date of Patent: Jun. 28, 2022

(54) FACILITATING DATA REDUCTION USING WEIGHTED SIMILARITY DIGEST

(71) Applicant: EMC IP Holding Company LLC, Hopkinton, MA (US)

(72) Inventors: Alexei Kabishcer, Ramat Gan (IL); Uri Shabi, Tel Mond (IL); Ronen Gazit, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/081,007

(22) Filed: Oct. 27, 2020

(65) Prior Publication Data
US 2022/0129176 A1 Apr. 28, 2022

(51) Int. Cl.
*G06F 3/06* (2006.01)

(52) U.S. Cl.
CPC ............ *G06F 3/0638* (2013.01); *G06F 3/067* (2013.01); *G06F 3/0608* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–82; G06N 3/00–126; G06N 5/00–048; G06N 7/00–08; G06N 10/00; G06N 20/00–20; G06N 99/00–007;

(Continued)

(56) References Cited

U.S. PATENT DOCUMENTS

| | | | |
|---|---|---|---|
| 8,914,338 B1 * | 12/2014 | Wallace | G06F 3/0683 707/693 |
| 9,141,289 B2 * | 9/2015 | Umbehocker | G06F 3/067 |

(Continued)

OTHER PUBLICATIONS

R. Lin, D. A. Ross and J. Yagnik, "SPEC hashing: Similarity preserving algorithm for entropy-based coding," 2010 IEEE Computer Society Conference on Computer Vision and Pattern Recognition, 2010, pp. 848-854 (Year: 2010).*

(Continued)

*Primary Examiner* — Daniel C. Chappell
(74) *Attorney, Agent, or Firm* — BainwoodHuang

(57) ABSTRACT

A technique for managing data storage includes generating digests of chunks of data. The digests are arranged to provide similar results for similar chunks but to weight contributions from different regions of chunks differently based on their entropy. Chunks that differ in low-entropy regions tend to produce more similar digests than do chunks that differ in high-entropy regions. The technique further includes identifying similar chunks based on similarity of their digests and preforming data reduction on one chunk by reference to another, storing any differences between the chunks separately.

20 Claims, 4 Drawing Sheets

(58) Field of Classification Search
CPC .... G11B 20/00–24; G11B 33/00–1493; G11C 7/00–24; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3297; H01L 2225/00–1094; H04L 9/00–38; H04L 12/00–66; H04L 41/00–5096; H04L 49/00–9094; H04L 61/00–6095; H04L 67/00–42

See application file for complete search history.

(56) References Cited

U.S. PATENT DOCUMENTS

| | | | | |
|---|---|---|---|---|
| 9,367,557 | B1* | 6/2016 | Lin | G06F 16/1744 |
| 10,037,336 | B1* | 7/2018 | Hu | G06F 16/313 |
| 10,452,616 | B1* | 10/2019 | Bassov | G06F 3/0641 |
| 10,503,516 | B1* | 12/2019 | Faibish | G06F 3/0688 |
| 10,614,038 | B1* | 4/2020 | Armangau | G06F 16/1752 |
| 10,664,165 | B1* | 5/2020 | Faibish | G06F 3/0689 |
| 2008/0040505 | A1* | 2/2008 | Britto | G06F 3/0667 709/226 |
| 2008/0243958 | A1* | 10/2008 | Prahlad | G06F 3/061 |
| 2011/0099351 | A1* | 4/2011 | Condict | G06F 3/0641 711/216 |
| 2013/0179408 | A1* | 7/2013 | Stoakes | G06F 3/0671 707/E17.005 |
| 2013/0247039 | A1* | 9/2013 | Tsutsui | G06F 3/067 718/1 |
| 2014/0244604 | A1* | 8/2014 | Oltean | H03M 7/30 707/693 |
| 2015/0019501 | A1* | 1/2015 | Akirav | G06F 3/0641 707/692 |
| 2015/0019815 | A1* | 1/2015 | Aronovich | G06F 12/122 711/129 |
| 2015/0019816 | A1* | 1/2015 | Akirav | G06F 3/0641 711/129 |
| 2015/0127621 | A1* | 5/2015 | Kuo | G06F 3/061 707/692 |
| 2015/0286442 | A1* | 10/2015 | Hudzia | G06F 12/1018 711/170 |
| 2018/0349053 | A1* | 12/2018 | Battaje | G06F 12/0891 |
| 2020/0134047 | A1* | 4/2020 | Bassov | G06F 3/061 |
| 2020/0341669 | A1 | 10/2020 | Shabi et al. | |
| 2021/0318959 | A1* | 10/2021 | Zhang | G06F 12/0815 |

OTHER PUBLICATIONS

F. Breitinger and H. Baier, "Properties of a similarity preserving hash function and their realization in sdhash," 2012 Information Security for South Africa, 2012, pp. 1-8 (Year: 2012).*

Ricardo Koller and Raju Rangaswami. 2010. I/O Deduplication: Utilizing content similarity to improve I/O performance. <i>ACM Trans. Storage</i> 6, 3, Article 13 (Sep. 2010), 26 pages. (Year: 2010).*

João Paulo and José Pereira. 2014. A Survey and Classification of Storage Deduplication Systems. <i>ACM Comput. Surv.</i> 47, 1, Article 11 (Jul. 2014), 30 pages. (Year: 2014).*

Shabi, Uri, et al.; "Deduplicating Full and Partial Block Matches," U.S. Appl. No. 16/668,523, filed Oct. 30, 2019.

Shabi, Uri, et al.; "Selectively Performing Inline Compression Based On Data Entropy," U.S. Appl. No. 16/669,160, filed Oct. 30, 2019.

Shabi, Uri, et al.; "Extending Deduplication Matches Using Data Comparison," U.S. Appl. No. 16/668,538, filed Oct. 30, 2019.

Shabi, Uri, et al.; "Deduplicating Unaligned Data," U.S. Appl. No. 16/668,506, filed Oct. 30, 2019.

Gazit, Ronen, et al.; "Opportunistic Partial Deduplication," U.S. Appl. No. 16/668,554, filed Oct. 30, 2019.

* cited by examiner

FACILITATING DATA REDUCTION USING WEIGHTED SIMILARITY DIGEST

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Many storage systems use data reduction to improve storage efficiency. For example, a storage system may implement a process called "deduplication," which avoids or eliminates duplicate copies of redundant blocks. As is known, a "block" is a unit of storage space, which typically corresponds to a smallest unit of data that a system can allocate. Deduplication may operate as a background process or in line with storage requests. Deduplication typically proceeds by representing blocks as digests (e.g., hash values), which are much smaller than blocks, and identifying block matches based on digest matches. Blocks found to have the same digests are consolidated and redundant copies are removed, or their initial storage is avoided (in the case of inline operation). Storage systems may also implement data compression. Unlike deduplication, which typically operates between blocks, compression typically operates within blocks, removing internal redundancy such that the amount of data can be reduced.

SUMMARY

Typical hash functions produce results that have no obvious relationship to the data from which they are generated. For example, two blocks that differ from each other by only a single bit but are otherwise identical normally yield completely different hash values. Nevertheless, hash functions are repeatable, meaning that they produce the same output given the same input.

The apparently random nature of hash functions can present an obstacle to storage systems. Although hash functions can be used as an effective basis for matching blocks that are identical, they provide no basis whatsoever for identifying blocks that are similar. We have recognized, however, that similarity among blocks can be a useful measure when performing data reduction. For example, if it were possible to readily identify blocks that are similar, modified deduplication could be performed, in which similar blocks could be deduplicated with small differences between the blocks stored separately, ideally in compressed form.

Unfortunately, the ability to identify blocks that have similar data is not always sufficient for optimal data reduction. For example, measures of similarity may indicate whether the data of two blocks are similar or different, but they say little about whether any differences are significant from the standpoint of data reduction. As a result, blocks identified as similar might end up being poor choices for deduplication if the differences between the blocks are incompressible. Likewise, blocks identified as different might actually be good choices for deduplication if the differences between them are highly compressible. Characterizing blocks as similar or different based on their data alone can thus fail to accurately identify opportunities for data reduction.

To address the above deficiencies at least in part, an improved technique for managing data storage includes generating digests of chunks of data. The digests are arranged to provide similar results for similar chunks but to weight contributions from different regions of chunks differently based on their entropy. Chunks that differ in low-entropy regions tend to produce more similar digests than do chunks that differ in high-entropy regions. The technique further includes identifying similar chunks based on similarity of their digests and performing data reduction on one chunk by reference to another, storing any differences between the chunks separately.

Advantageously, many data reduction opportunities which might otherwise be missed are more easily discoverable when taking entropy of differing regions of chunks into account. Not only are deduplication opportunities discovered, but also any residual differences between chunks tend to be low entropy and thus highly compressible. Overall data reduction is thus improved.

Certain embodiments are directed to a method of managing data storage. The method includes generating digests of respective chunks of data, a digest of a chunk generated by (i) identifying multiple sections of the chunk, (ii) calculating entropy of each of the sections, and (iii) weighting contributions of the sections to the digest based on the calculated entropy. The method further includes identifying a first chunk of the chunks as similar to a second chunk of the chunks based on comparing the digest of the first chunk with the digest of the second chunk, and performing data reduction on the first chunk, including (i) storing a reference to the second chunk in metadata of the first chunk, (ii) identifying a difference between the first chunk and the second chunk, and (iii) storing the difference at a location referenced by the metadata of the first chunk.

Other embodiments are directed to a computerized apparatus constructed and arranged to perform a method of managing data storage, such as the method described above. Still other embodiments are directed to a computer program product. The computer program product stores instructions which, when executed on control circuitry of a computerized apparatus, cause the computerized apparatus to perform a method of managing data storage, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique for performing data reduction includes generating digests of chunks of data. The digests are arranged to provide similar results for similar chunks but to weight contributions from different regions of chunks differently based on their entropy. Chunks that differ in low-entropy regions tend to produce more similar digests than do chunks that differ in high-entropy regions. The technique further includes identifying similar chunks based on similarity of their digests and performing data reduction of one chunk by reference to another, storing any differences between the chunks separately.

Figure 1:
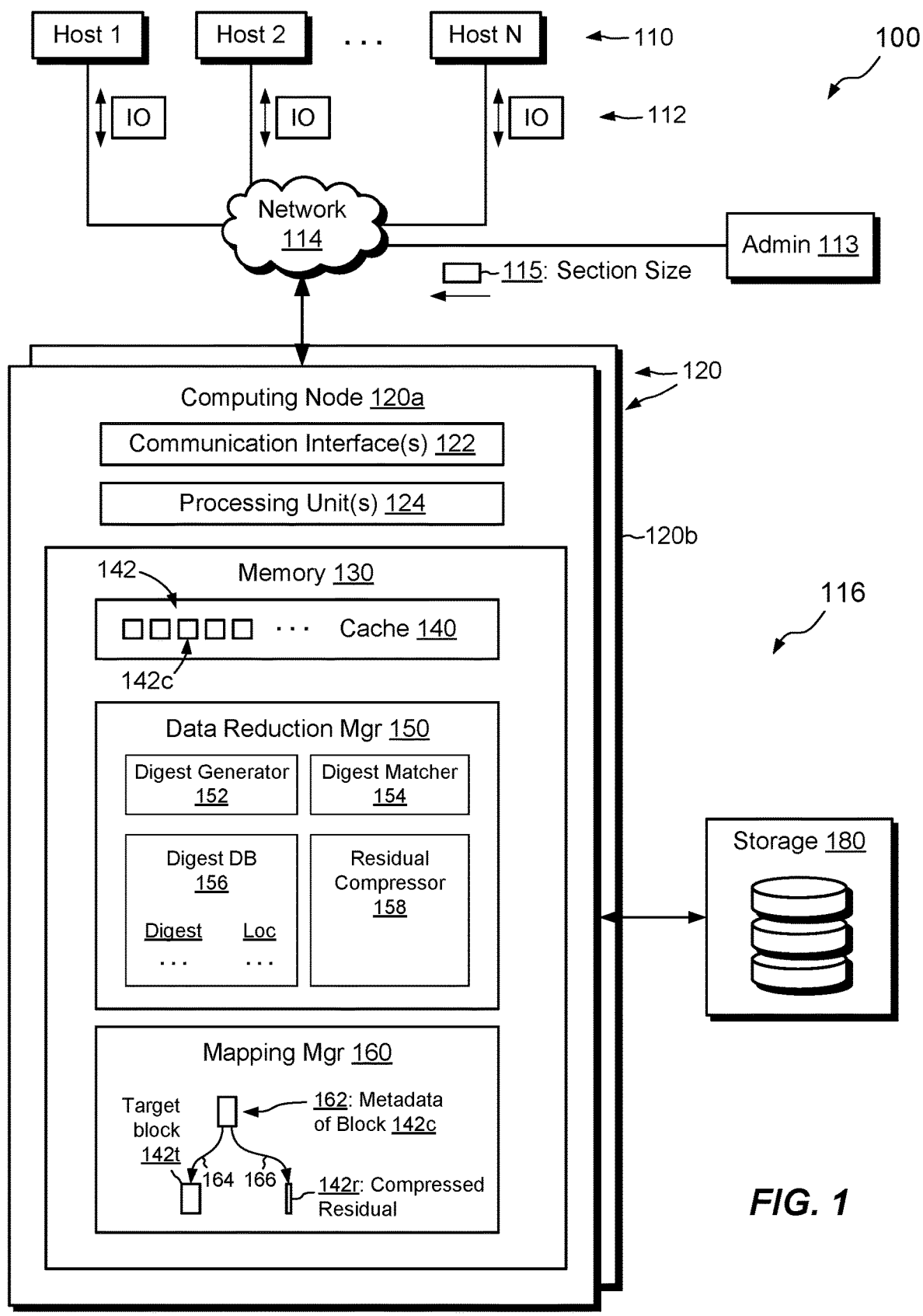
FIG. 1 is a block diagram of an example environment in which embodiments of the improved technique can be practiced.

FIG. 1 shows an example environment 100 in which embodiments of the improved technique can be practiced. As shown, multiple hosts 110 are arranged to access a data storage appliance 116 over a network 114. An administrative machine 113 may also be arranged to access the data storage appliance 116, e.g., for providing section size input 115, which will be described infra. The data storage appliance 116 includes a computing node 120a (also referred to as a "node," "storage processor," or "SP") and storage 180, such as magnetic disk drives, electronic flash drives, and/or the like. The data storage appliance 116 may include multiple nodes 120 (e.g., a second node 120b). Multiple nodes 120 may be provided as circuit board assemblies or blades, which plug into a chassis that encloses and cools the nodes 120. The chassis has a backplane for interconnecting the nodes 120, and additional connections may be made among nodes 120 using cables. In some examples, the appliance 116 is part of a storage cluster, such as one that contains any number of storage appliances 116, where each appliance includes a pair of nodes 120 coupled to shared storage devices. In some arrangements, a host application runs directly on a node (or nodes), such that separate host machines 110 need not be present. No particular hardware configuration is required, and any number of nodes 120 may be provided, including a single node 120, in any arrangement, and the node or nodes 120 can be any type of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the SP 120a using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. Each node 120 is configured to receive I/O requests 112 according to block-based and/or file-based protocols and to respond to such I/O requests 112 by reading or writing the storage 180.

As shown, the node 120a includes one or more communication interfaces 122, a set of processors 124, and memory 130. The communication interfaces 122 include, for example, SCSI target adapters and/or network interface adapters for converting electronic and/or optical signals received over the network 114 to electronic form for use by the node 120a. The processor(s) 124 include one or more processing chips and/or assemblies, such as numerous multi-core CPUs (central processing units), coprocessors, and the like.

The memory 130 includes both volatile memory, e.g., RAM (Random Access Memory), and non-volatile memory, such as one or more ROMs (Read-Only Memories), disk drives, solid state drives, and the like. The processor(s) 124 and memory 130 together form control circuitry, which is constructed and arranged to carry out various methods and functions as described herein. Also, the memory 130 includes a variety of software constructs realized in the form of executable instructions. When the executable instructions are run by the processor(s) 124, the processor(s) 124 carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a cache 140, a data reduction manager 150, and a mapping manager 160. Cache 140 is configured to receive incoming data, such as data arriving in I/O requests 112 from hosts 110, and to arrange such data into blocks 142, such as 4-kB or 8-kB blocks, for example. Other block sizes may be used. In general, cache 140 is configured to store data temporarily until such data can be placed more permanently in storage 180.

Data reduction manager 150 is configured to reduce the amount and/or size of data, e.g., by applying deduplication and/or compression. Data reduction is typically lossless, such that all data written to the data storage appliance 116 can be retrieved with no loss of information.

Mapping manager 160 is configured to map logical blocks to physical data. Logical blocks correspond to blocks within host-accessible data objects, such as files or LUNs (Logical UNits). Physical data, by contrast, correspond to specific extents in storage 180. In an example, the mapping manager 160 includes a series of pointers that connect logical addresses in the data storage appliance 116 to respective physical extents. The mapping manager 160 may include multiple layers of pointers, such as indirect block layers, a block virtualization layer, and a RAID (Redundant Array of Independent Disks) layer, for example.

As further shown in FIG. 1, the above-described data reduction manager 150 includes a digest generator 150, a digest matcher 154, a digest database 156, and a residual compressor 158. These may be configured as follows:

Digest generator 150 is configured to generate digests of blocks 142, such as entropy-weighted similarity digests (EWSDs), as described more fully below.

Digest matcher 154 is configured to group together blocks based on similarity, such as similarity among their EWSDs.

Digest database 156 is a data structure that associates digests (including EWSDs) of previously-processed blocks with respective locations where the blocks can be found.

Residual compressor 158 is configured to compress differences between blocks, such as between blocks 142 that the digest matcher 154 has grouped together.

In example operation, hosts 110 issue I/O requests 112 to the data storage appliance 116. The computing node 120*a* receives the I/O requests 112 at the communication interfaces 122 and initiates further processing. For example, node 120*a* places incoming data from write I/O requests into cache 140, which arranges the data into blocks 142.

Data reduction manager 150 may attempt to reduce the data content in blocks 142 so as to improve storage efficiency. For example, digest generator 152 obtains a candidate block 142*c* from cache 140 and generates an EWSD therefrom. The EWSD is a specialized type of digest that is arranged to produce similar or identical results for similar data, but to produce different results for different data. In this sense, the EWSD may be regarded as a type of similarity hash. Similarity hashes are the subject of continuing development, with an earlier example disclosed in copending U.S. application Ser. No. 16/668,523, filed Oct. 30, 2019, the contents and teachings of which are incorporated herein by reference. The EWSD as described herein differs, however, from the one described in U.S. Ser. No. 16/668,523, in that it treats different portions of a block differently based on the entropy of the respective portions. The EWSD thus tends to amplify the effects of high-entropy portions but to attenuate the effects of low-entropy portions.

Consider, for example, two blocks that differ in 128 byte locations but are identical in all other locations. According to improvements hereof, if the data at these 128 locations has low entropy, the resulting EWSD values might be identical, or nearly so. But if the data at these 128 locations has high entropy, the resulting EWSD values would tend to differ markedly. In the low-entropy case the two blocks may be deemed similar, but in the high-entropy case the two blocks may be deemed different. In contrast, the similarity hash disclosed in U.S. Ser. No. 16/668,523 would tend to produce the same result in both cases.

With the EWSD of block 142*c* generated, digest matcher 154 may search the digest database 156 for one or more previously-processed blocks that have the same EWSD value, or a similar value. In an example, similarity between EWSDs may be judged based on Hamming distance, i.e., numbers of bits (or other symbols) that are different. The smaller the Hamming distance, the more similar the EWSDs. In an example, the digest matcher 154 applies a threshold Hamming distance for distinguishing blocks that are similar from blocks that are different.

In the instant example, it is assumed that that the digest matcher 154 succeeds in locating a target block 142*t* in the digest database 156. The target block 142*t* has the same EWSD or a similar EWSD to that of the candidate block 142*c*. In an example, target block 142*t* may be one of the blocks 142, e.g., a block that was recently received. However, target block 142*t* may have been received at any previous time.

Having located the target block 142*t*, the data reduction manager 150 may proceed to perform deduplication on the candidate block 142*c* using the target block 142*t* as a reference. For example, data reduction manager 150 accesses metadata 162 of candidate block 142*c*, such as block virtualization metadata and/or other mapping metadata allocated for candidate block 142*c*. Rather than storing the data of candidate block 142*c* in a new extent of physical storage space, data reduction manager 150 instead arranges a pointer 164 in metadata 162 to point to the target block, i.e., already-stored data of the target block 142*t*, which is preferably compressed and backed by storage 180. Storage of the candidate block 142*c* is thus achieved without having to write the entire candidate block 142*c*, thus realizing an increment of data reduction.

Given that the candidate block 142*c* and the target block 142*t* are similar but not necessarily identical, it may be necessary to store a residual difference between the two blocks. To this end, residual compressor 158 compares the two blocks, e.g., by executing an exclusive-OR (XOR) of block 142*c* with block 142*t*. The result of the XOR has a value of "1" where the two blocks are different and a value of "0" where the two blocks are the same. The residual compressor 158 then compresses the XOR result to generate compressed residual 142*r*, which is then stored as physical data backed by storage 180. Also, data reduction manager 150 arranges the metadata 162 so that it points to the compressed residual 142*r*, e.g., via pointer 166. Thus, the metadata 162 of candidate block 142*c* points to both the target block 142*t* and the compressed residual 142*r*. When it comes time to read the candidate block 142*c*, the computing node 120*a* can access the metadata 162 of the candidate block 142*c*, retrieve the data of the target block 142*t* and the residual 142*r*, decompress both, and XOR them together to reconstitute the candidate block 142*c*.

When implemented across many blocks, the above-described technique can save significant storage space. The EWSD enables storage systems to take fuller advantage of similarity between blocks that may not be apparent simply by comparing their data. It also enables systems to avoid data reduction activities that are unlikely to result in real savings.

One should appreciate that the details of FIG. 1 have been simplified to facilitate ease of understanding. For example, rather than simply searching the digest database 156 for similar blocks, the data reduction manager 150 may use a clustering technique, such as the one described in incorporated U.S. Ser. No. 16/668,523. Further, the particular arrangement of metadata in the mapping manager 160 may be varied. For instance, metadata 162 may be realized with multiple structures, and any of the indicated pointers may be realized with multiple pointers that involve different structures. The example shown is therefore intended to be illustrative but not limiting.

Figure 2:
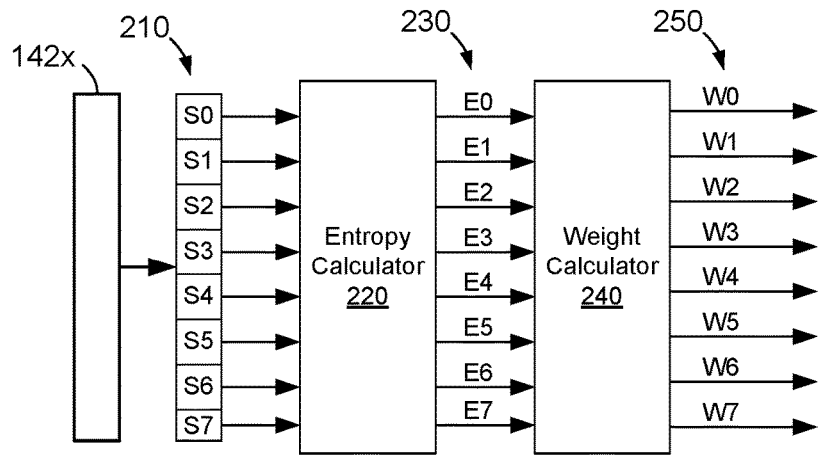
FIGS. 2 and 3 are block diagrams showing an example arrangement for generating a digest from a chunk in accordance with improvements hereof.

FIG. 2 shows an example arrangement for assigning weights 250 to respective sections 210 of a block 142*x*, which may be done as part of generating an EWSD of the block 142*x*. The depicted example further involves an entropy calculator 220 and a weight calculator 240.

As shown, block 142*x*, e.g., any of the blocks 142, is provided as multiple sections 210, labeled S0-S7. The sections 210 are typically uniform in length, but this is not required. For example, different ones of the sections 210 may have different sizes. Also, any number of sections 210 may be provided.

In some examples, the sizes of sections 210 are set by an administrator, such as by an administrator via input 115 received from admin machine 113 (FIG. 1). In other examples, the sizes of sections 210 are set automatically, e.g., based on a data format of the block 142*x*. For instance, if block 142*x* is known to have a footer that is 512 B long, then the data reduction manager 150 may provide a section 210 that aligns with the footer and has the same size as the footer. Likewise, if the block 142*x* contains multiple records having known sizes, the sizes of sections 210 may be established to match the record sizes (or some integer multiple thereof) and may be placed to align with them. In general, aligning sections 210 with recognizably distinct portions of the block 142x tends to improve results. Although sections 210 are seen to span the entire range of block 142x, this is not required. For example, portions of block 142x may be excluded from sections 210, e.g., if there are special requirements, such that they do not contribute to EWSD results.

As further shown, entropy calculator 220 generates entropy values 230 (E0-E7) of the respective sections 210 (S0-S7), i.e., one entropy value 230 per section 210. Thus, entropy value E0 is the entropy of section S0, entropy value E1 is the entropy of section S1, and so on. Entropy calculator 220 may calculate entropy 230 in any suitable way. One example approach to calculating entropy is disclosed in copending U.S. patent application Ser. No. 16/669,160, filed Oct. 30, 2019, the contents and teachings of which are incorporated herein by reference.

As still further shown, weight calculator 240 is configured to generate weights 250 (W0-W7) from respective entropy values 230 (E0-E7). For example, weight calculator 240 generates weights 250 by normalizing entropy values 230, e.g., using min-max normalization, z-score normalization, or the like. In some examples, weight calculator 240 may transform entropy values 230 (or normalized versions thereof) based on a predetermined mapping characteristic, such as linear, exponential, or logarithmic. Linear mapping represents equal differences in entropy values 230 as equal differences in weights 250. In contrast, exponential mapping represents equal differences in entropy as progressively larger differences in weights, while logarithmic mapping represents equal differences in entropy as progressively smaller differences in weights. In any case, weight 250 preferably increases monotonically with entropy 230, such that an increase in entropy corresponds to an increase in the weight.

Figure 3:
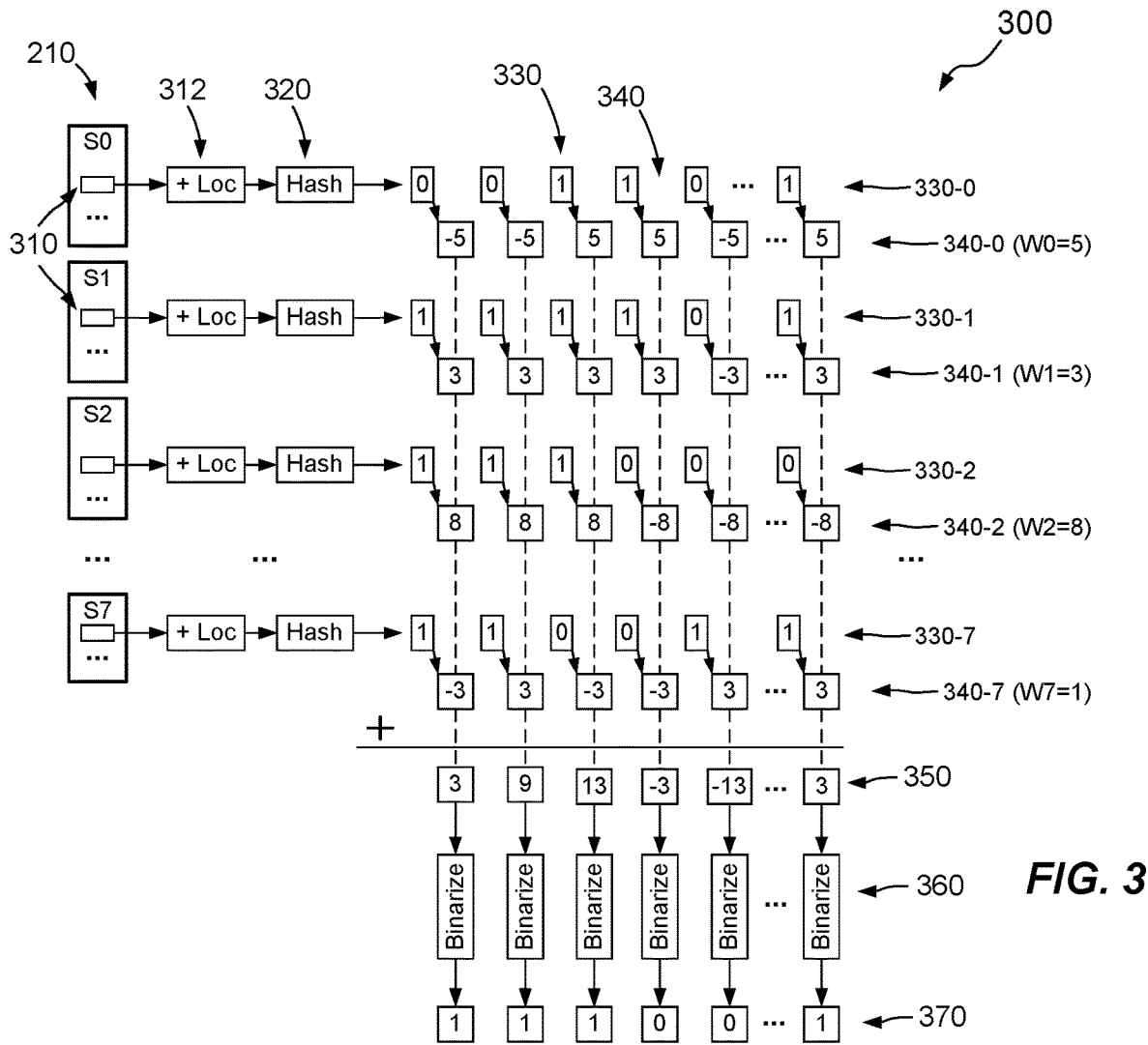

FIG. 3 shows an example arrangement 300 for generating an EWSD 370 of a block 142,x given the sections 210 and weights 250 as established in FIG. 2. Here, sections 210 are arranged vertically along the left, in order from S0 to S7. Each of the sections 210 includes a set of features 310, where each feature 310 corresponds to an amount of contiguous data in a section, such as 1 byte, 4 bytes, 8 bytes, etc. Features 310 may be uniform in size, but this is not required.

Proceeding to the right, arrow 312 indicates the data of each feature 310 being salted with a location indicator, which corresponds, for example, to a relative position of the respective feature in the block 142c. For instance, the first feature (topmost) may be salted by concatenating this feature with a "1," the next feature may be salted by concatenating it with a "2," and so forth. Salting each feature 310 with an indicator of its location ensures that the same feature is represented by a different hash value when it appears at different locations within the block 142c.

As shown by arrow 320, a hash function is executed on each salted feature individually. The hash function may be a fully cryptographic or semi-cryptographic hash function, for example. Simple hash functions may be used provided they are consistent.

Hash values 330 that result from execution of hash functions 320 are shown to the right, with their bits laid out horizontally in order. For example, hash value 330-0 is a hash of the salted feature shown in S0, hash value 330-1 is a hash of the salted feature shown in S1, and so on.

It is at this point that entropy-based weighting comes into play. For example, shown just below and offset from the hash values 330 are respective sets of products 340. Each set of products 340 is constructed as a series of values, with one value provided per bit of the respective hash value 330. For example, products 340-0 correspond to respective bits of hash value 330-0, products 340-1 correspond to respective bits of hash value 330-1, and so on. Each product represents a respective bit of a hash value transformed by the weight of the corresponding section 210, i.e., the section that contains the feature 310 from which the hash value is created. In the arrangement shown, bit values of 1 map to the respective weight, and bit values of 0 map to negative-one times the respective weight. Thus, where weight W0=5 for products 340-0, bit values of 1 map to 5 and bit values of 0 map to −5.

It might seem more straightforward to map bit values of 0 to 0, rather than to negative-one times the weight, and doing so could certainly work, but mapping bit values as described is more computationally efficient, as resulting products tend to center around 0. Given that large summations of products follow, mapping 0 to negative-one times the weight can prevent overflow.

Products 340 are generated in the above manner for each of the hash values 330. FIG. 3 shows only four hash values 330, and thus four sets of products 340, but one should appreciate that a 4-kB block might necessitate 4096 different hash values 330, if the size of individual features 310 is one byte.

With the sets of products 340 in place, columns of products (shown with dotted lines) may be summed to produce product sums 350. As shown, there is one product sum 350 for each bit position of the hash and each product sum 350 represents a summation of all products 340 at the respective bit position. One should note that the product sums 350 are kept from becoming enormous by virtue of the centering of products 340 around zero, as described above.

As a final step, the products sums 350 may be binarized 360 to yield the EWSD 370, e.g., by assigning any positive product sum to 1 and any negative product sum to 0. Demonstration results are shown.

One may note that binarization 360 simplifies the product sums 350 considerably, effectively throwing away a lot of information. This can be a feature rather than a bug, however, as the crude process of binarizing causes the resulting EWSD 370 to be insensitive to small differences between blocks. For example, if EWSD is generated on another block that is identical to block 142x except for one of its features 310, the different feature would produce a different hash value 330, but that hash value 330 might be only one of thousands that contribute to the product sums 350. It may thus have no effect on EWSD 370. Indeed, changes in multiple features 310 may be needed to register any change in EWSD 370.

One may further note that entropy has a strong effect on EWSD 370. For example, a feature 310 associated with a weight of one has one-tenth the impact on product sums 350 as a feature associated with a weight of ten. When comparing EWSDs, differences in high-entropy features are much more likely to yield different EWSDs than are differences in low-entropy features. Thus, blocks that differ in high-entropy features are unlikely to be grouped together for deduplication. They will be deemed too different, and any residuals formed from their differences are likely to be poorly compressible. Conversely, blocks that differ only in low-entropy features yield small differences in product sums 350 and are much more likely to be grouped together for deduplication, with residuals between or among them being highly compressible.

Figure 4:
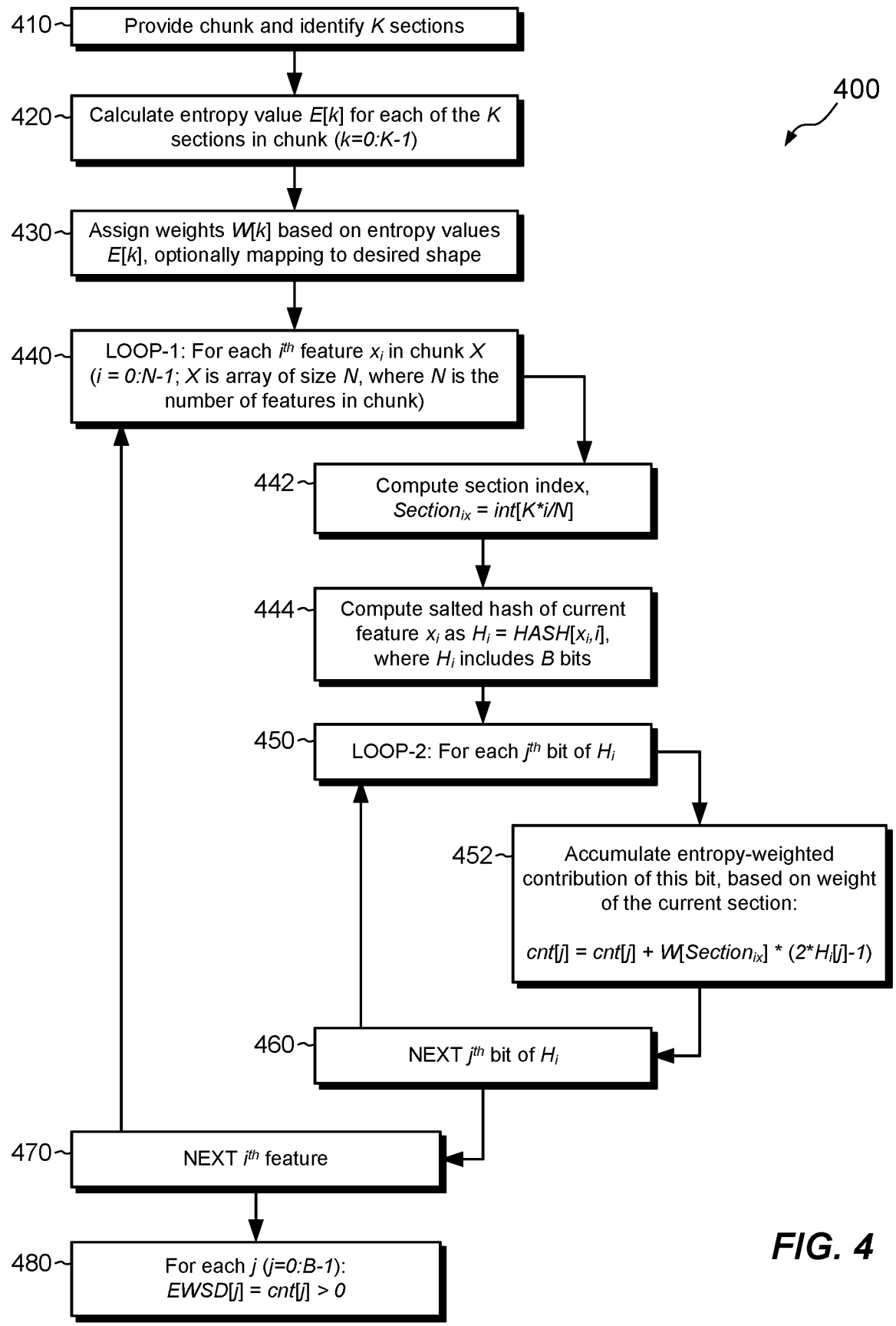
FIG. 4 is a flowchart showing an example method of generating a digest from a chunk in accordance with improvements hereof.
Figure 5:
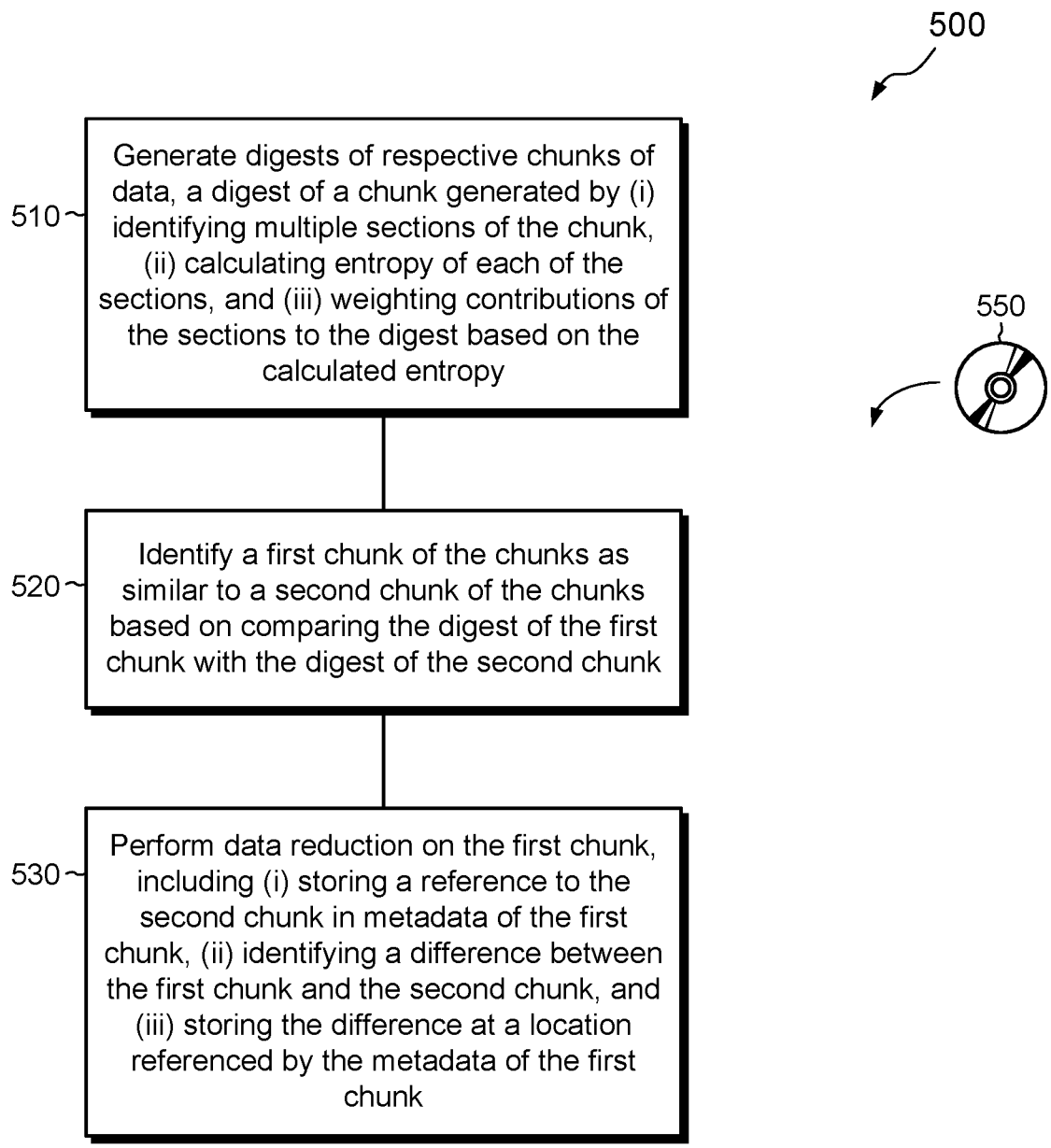
FIG. 5 is a flowchart showing an example method of managing data storage.

FIGS. 4 and 5 show example methods 400 and 500 that may be carried out in connection with the environment 100. The methods 400 and 500 are typically performed, for example, by the software constructs described in connection with FIG. 1, which reside in the memory 130 of the computing node 120a and are run by the set of processors 124. The various acts of methods 300 and 400 may be ordered in any suitable way. Accordingly, embodiments may be constructed in which acts are performed in orders different from those illustrated, which may include performing some acts simultaneously.

FIG. 4 shows an example method 400 of generating an entropy-weighted similarity digest (EWSD) 370 of a block 142x, which may be referred to more generally as a "chunk" herein to emphasize that the method 400 is suitable for use with data of any denomination. The activities presented in method 400 are similar to those described in connection with FIGS. 2 and 3, but the depiction of FIG. 4 is more amenable to computerized implementations. The method 400 thus provides a concrete example that should not be construed as limiting.

At 410, a chunk (e.g., block 142x) is obtained or provided, and K sections 210 are identified in the chunk. For example, data reduction manager 150 may obtain the chunk and proceed to render the chunk as K distinct sections 210. Each section 210 may be identified by an index k, which ranges from 0 to K−1. The sections 210 may be identified based at least in part on input 115 from administrative machine 113 and/or based at least in part on automatic activity, which may take account of any data format of the chunk. The sections 210 may be uniform in size, but the sizes may also be different. For example, different sections 210 may be provided in different sizes to match up with respective content regions in the chunk.

At 420, a respective entropy value E[k] (k=0:K−1) is calculated for each of the K sections. For example, entropy calculator 220 computes a respective entropy value 230 of the data contained in each of the respective sections 210. The entropy values 230 will normally differ for different sections 210, reflecting different information density in the respective sections.

At 430, a weight W[k] (k=0:K−1) is assigned to each of the entropy values E[k]. Applying weights 250 to entropy values 230 may include normalizing entropy values, e.g., using min-max normalization, z-score normalization, or the like. In some examples, applying weights 250 may include transforming entropy values 230 based on a predetermined mapping characteristic, such as linear, exponential, logarithmic, or the like, and may include rescaling the weights.

At 440, operation enters a first loop (LOOP-1), which iterates over each of the features 310 in the chunk. N represents the number of features 310 in the chunk, and i is a loop index that ranges from 0 to N−1. X represents the chunk, and $x_i$ represents the current feature. If each feature 310 is a byte and the chunk is a 4-kB block, for example, then N would be 4096 and LOOP-1 would execute 4096 times.

Within LOOP-1, at 442 a section index $Section_{ix}$ is obtained. The section index is the index of the current section 210, i.e., the section that contains the current feature, $x_i$. The section index $Section_{ix}$ may be computed as follows:

$$Section_{ix} = \text{int}\left[K * \frac{i}{N}\right].$$

At 444, also within LOOP-1, a salted hash value is computed of the current feature $x_i$. The salted hash value depends on both data of $x_i$ and feature position i and may thus be represented as follows:

$H_i = \text{HASH}[x_i, i]$.

At 450, also within LOOP-1, a second loop LOOP-2 is entered. LOOP-2 is nested within LOOP-1 and iterates over each bit position of hash value $H_i$. The total number of bit positions of $H_i$ is given as B and a bit-position index is given as j.

Within both loops at 452, a weighted count cnt[j] is accumulated for the current ($j^{th}$) bit position and may be expressed as follows:

$cnt[j] = cnt[j] + W[Section_{ix}] * (2 * H_i[j] - 1)$.

$H_i[j]$ is the bit value at the $j^{th}$ bit position of the $i^{th}$ hash value (of the $i^{th}$ salted feature). The expression $(2*H_i[j]-1)$ zero-biases the bit value, such that a value of 1 yields 1 and a value of 0 yields −1. The benefits of zero-biasing have been described above. The zero-biased bit value $(2*H_i[j]-1)$ is then multiplied by $W[Section_{ix}]$, i.e., the weight of the current section, such that the expression $W[Section_{ix}]*(2*H_i[j]-1)$ represents the entropy-weighted, zero-biased value of the current bit of the current hash value. The illustrated weighting causes large values of weight $W[Section_{ix}]$ to contribute more to cnt[j] than do small values, meaning that entropy has an amplifying effect on cnt[j].

As shown at 460, LOOP-2 iterates across all values of j, i.e., until counts cnt[j] have been accumulated for all B bits of the current hash value $H_i[j]$. At the conclusion of LOOP-2, the current feature 310 has been fully processed and operation proceeds to 470, whereupon LOOP-1 is repeated on the next feature 310, e.g., on the next byte of the chunk. Repetition of LOOP-1 (and its included LOOP-2) is repeated for each of the N features 310 until all features have been processed. It is noted that values of cnt[j] are not reset on successive iterations of LOOP-1 but rather continue to accumulate (corresponding to what is shown via the dotted lines in FIG. 3). Given the zero-biasing of weight contributions, the values of cnt[j] are not expected to grow excessively large and overflow problems are avoided.

Upon the last iteration of LOOP-1, operation proceeds from 470 to 480. At this point, all features 310 have been processed and all B values of cnt[j] reflect contributions from all features 310.

At 480, the final values of cnt[j] are binarized. For example, any positive values of cnt[j] are set to 1 and any negative values are set to 0. This may be achieved in the example shown by setting EWSD[j]=cnt[j]>0 at each of the B bit positions (cnt[j]>0 is a Boolean that evaluates to 1 or 0). The resulting array EWSD then contains the bits, in order, of the EWSD 370 and provides the desired result.

FIG. 5 shows an example method 500 of managing data storage and provides an overview of some of the activities described above.

At 510, digests, such as EWSDs 370, are generated of respective chunks of data, such as blocks 142. A digest of a chunk is generated by (i) identifying multiple sections 210 of the chunk, (ii) calculating entropy 230 of each of the sections 210, and (iii) weighting (e.g., using weights 250) contributions of the sections 210 to the digest based on the calculated entropy 230.

At 520, a first chunk of the chunks, e.g., candidate block 142c, is identified as similar to a second chunk of the chunks, e.g., a target block 142t, based on comparing the digest (e.g., EWSD) of the first chunk with the digest (e.g., EWSD) of the second chunk.

At 530, data reduction is performed on the first chunk. The data reduction includes (i) storing a reference, e.g., pointer 164, to the second chunk, e.g., 142t, in metadata 162 of the first chunk, (ii) identifying a difference 142r between the first chunk and the second chunk, and (iii) storing the difference 142r at a location referenced by the metadata 162 of the first chunk, e.g., via pointer 166.

An improved technique has been described for managing data storage. The technique includes generating digests (e.g., EWSDs) of chunks of data. The digests are arranged to provide similar results for similar chunks but to weight contributions from different regions of chunks differently based on their entropy. Chunks that differ in low-entropy regions tend to produce more similar digests than do chunks that differ in high-entropy regions. The technique further includes identifying similar chunks based on similarity of their digests and performing data reduction on one chunk by reference to another, storing any differences between the chunks separately.

Having described certain embodiments, numerous alternative embodiments or variations can be made. For example, although embodiments have been described which apply entropy-weighted similarity digests (EWSDs) when performing data reduction, EWSDs may be used in other applications. Examples may include data classification and data characterization. Further, although embodiments have been described in which data-reduction involves deduplication and compression, embodiments may be constructed that involve only deduplication or only compression.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 550 in FIG. 5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

The invention claimed is:

1. A method of managing data storage, comprising:
generating digests of respective chunks of data, a digest of a chunk generated by (i) identifying multiple sections of the chunk, (ii) calculating entropy of each of the sections, and (iii) weighting contributions of the sections to the digest based on the calculated entropy, said weighting including calculating weights for respective sections based on respective entropy values and modifying contributions of the respective sections to the digest based on the respective weights;
identifying a first chunk of the chunks as similar to a second chunk of the chunks based on comparing the digest of the first chunk with the digest of the second chunk; and
performing data reduction on the first chunk, including (i) storing a reference to the second chunk in metadata of the first chunk, (ii) identifying a difference between the first chunk and the second chunk, and (iii) storing the difference at a location referenced by the metadata of the first chunk.

2. The method of claim 1, wherein performing the data reduction on the first chunk further includes compressing the difference between the first chunk and the second chunk, wherein storing the difference includes storing the compressed difference.

3. The method of claim 2, wherein identifying the sections of the chunk includes providing chunks that are non-uniform in size.

4. The method of claim 2, further comprising establishing a size of at least one of the sections as an adjustable parameter.

5. The method of claim 4, wherein establishing the size is based on a data format of the chunk.

6. The method of claim 2, wherein generating the digest of the chunk includes:
identifying a first feature in a first section of the chunk;
generating a first hash value of the first feature; and
producing a first set of products based on respective bits of the first hash value and a weight of the first section, the weight of the first section based on the entropy of the first section.

7. The method of claim 6, wherein generating the first hash value of the first feature includes salting the first feature based on a position of the first feature in the chunk.

8. The method of claim 6, wherein generating the digest of the chunk further includes:
identifying a second feature in a second section of the chunk;
generating a second hash value of the second feature;
producing a second set of products based on respective bits of the second hash value and a weight of the second section, the weight of the second section based on the entropy of the second section; and
generating a set of product sums based at least on part on the first set of products and the second set of products.

9. The method of claim 8, wherein producing the second set of products includes representing bit values of 1 in the second hash value as the weight of the second section and representing bit values of 0 in the second hash value as negative one times the weight of the second section.

10. The method of claim 8, wherein the digest of the chunk is further generated by mapping each of the set of product sums to a respective binary number.

11. The method of claim 1, wherein weighting the contributions to the digest based on the calculated entropy includes ascribing a higher weight to a section having higher entropy and ascribing a lower weight to a section having lower entropy.

12. The method of claim 11, wherein weighting the contributions to the digest further includes transforming the calculated entropy of the sections to respective weights based on a predetermined mapping characteristic that is one of (i) linear, (ii) exponential, or (iii) logarithmic.

13. A computerized apparatus, comprising control circuitry that includes a set of processors coupled to memory, the control circuitry constructed and arranged to:
generate digests of respective chunks of data, a digest of a chunk generated by (i) identifying multiple sections of the chunk, (ii) calculating entropy of each of the sections, and (iii) weighting contributions of the sections to the digest based on the calculated entropy, said weighting including calculating weights for respective sections based on respective entropy values and modifying contributions of the respective sections to the digest based on the respective weights;
identify a first chunk of the chunks as similar to a second chunk of the chunks based on comparing the digest of the first chunk with the digest of the second chunk; and
perform data reduction on the first chunk, including (i) storing a reference to the second chunk in metadata of the first chunk, (ii) identifying a difference between the first chunk and the second chunk, and (iii) storing the difference at a location referenced by the metadata of the first chunk.

14. A computer program product including a set of non-transitory, computer-readable media having instructions which, when executed by control circuitry of a computerized apparatus, cause the computerized apparatus to perform a method of managing data storage, the method comprising:
generating digests of respective chunks of data, a digest of a chunk generated by (i) identifying multiple sections of the chunk, (ii) calculating entropy of each of the sections, and (iii) weighting contributions of the sections to the digest based on the calculated entropy, said weighting including calculating weights for respective sections based on respective entropy values and modifying contributions of the respective sections to the digest based on the respective weights;
identifying a first chunk of the chunks as similar to a second chunk of the chunks based on comparing the digest of the first chunk with the digest of the second chunk; and
performing data reduction on the first chunk, including (i) storing a reference to the second chunk in metadata of the first chunk, (ii) identifying a difference between the first chunk and the second chunk, and (iii) storing the difference at a location referenced by the metadata of the first chunk.

15. The computer program product of claim 14, wherein performing the data reduction on the first chunk further includes compressing the difference between the first chunk and the second chunk, wherein storing the difference includes storing the compressed difference.

16. The computer program product of claim 14, further comprising establishing a size of at least one of the sections as an adjustable parameter.

17. The computer program product of claim 14, wherein establishing the size is based on a data format of the chunk.

18. The computer program product of claim 14, wherein generating the digest of the chunk includes:
identifying a first feature in a first section of the chunk;
generating a first hash value of the first feature; and
producing a first set of products based on respective bits of the first hash value and a weight of the first section, the weight of the first section based on the entropy of the first section.

19. The computer program product of claim 18, wherein generating the first hash value of the first feature includes salting the first feature based on a position of the first feature in the chunk.

20. The computer program product of claim 18, wherein generating the digest of the chunk further includes:
identifying a second feature in a second section of the chunk;
generating a second hash value of the second feature;
producing a second set of products based on respective bits of the second hash value and a weight of the second section, the weight of the second section based on the entropy of the second section; and
generating a set of product sums based at least on part on the first set of products and the second set of products.

* * * * *